United States Patent
Tazume

(10) Patent No.: US 12,541,202 B2
(45) Date of Patent: Feb. 3, 2026

(54) UNMANNED VEHICLE AND INFORMATION PROCESSING METHOD

(71) Applicant: RAKUTEN GROUP, INC., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 224 days.

(21) Appl. No.: 18/184,749

(22) Filed: Mar. 16, 2023

(65) Prior Publication Data

US 2023/0305571 A1     Sep. 28, 2023

(30) Foreign Application Priority Data

Mar. 23, 2022 (JP) ................................. 2022-047141

(51) Int. Cl.
*G05D 1/00*     (2024.01)

(52) U.S. Cl.
CPC .................................. *G05D 1/0246* (2013.01)

(58) Field of Classification Search
CPC ...................................................... G05D 1/0246
See application file for complete search history.

(56) References Cited

U.S. PATENT DOCUMENTS

| | | | |
|---|---|---|---|
| 2017/0176999 A1* | 6/2017 | Bobda | G05D 1/0297 |
| 2020/0023523 A1* | 1/2020 | Uezu | G05D 1/0251 |
| 2020/0097890 A1 | 3/2020 | Migita | |
| 2021/0031370 A1* | 2/2021 | Spurgeon | B25J 9/1669 |
| 2021/0130114 A1* | 5/2021 | Salter | G06Q 10/087 |
| 2021/0208603 A1 | 7/2021 | Tazume et al. | |
| 2021/0256709 A1* | 8/2021 | Madden | H04N 7/186 |

FOREIGN PATENT DOCUMENTS

| | | |
|---|---|---|
| WO | 2018/216502 A1 | 11/2018 |
| WO | 2020/115902 A1 | 6/2020 |

* cited by examiner

*Primary Examiner* — Hunter B Lonsberry
*Assistant Examiner* — Harrison Heflin
(74) *Attorney, Agent, or Firm* — Sughrue Mion, PLLC

(57) ABSTRACT

An unmanned vehicle is configured to execute: a capturing device detection process that detects an external capturing device located at or around a delivery location where a package is to be received; a range identifying process that identifies a capture range of the external capturing device; a stop position determining process that determines, within the capture range of the external capturing device, a stop position of the unmanned vehicle at which the package is to be received; and a movement control process that stops the unmanned vehicle at the stop position.

14 Claims, 9 Drawing Sheets

Fig.2

| Delivery Number | User ID | Delivery Address | Delivery Date | Box Number | Notification Destination | Delivery Status |
|---|---|---|---|---|---|---|
| **** | **** | **** | **** | 1 | **** | Delivery Completed |
| **** | **** | **** | **** | 4 | **** | In Transit |
| **** | **** | **** | **** | 2 | **** | Not Yet Delivered |
| ⋮ | ⋮ | ⋮ | ⋮ | ⋮ | ⋮ | ⋮ |

| Vehicle Identification Information | Vehicle Type | Stop Position | Vehicle Body Orientation | Delivery Date |
|---|---|---|---|---|
| **** | **** | **** | **** | **** |
| **** | **** | **** | **** | **** |
| **** | **** | **** | **** | **** |
| ⋮ | ⋮ | ⋮ | ⋮ | ⋮ |

| Camera Recognizing Position | Delivery Number | Delivery Date |
|---|---|---|
| **** | **** | **** |
| **** | **** | **** |
| **** | **** | **** |
| ⋮ | ⋮ | ⋮ |

52

UNMANNED VEHICLE AND INFORMATION PROCESSING METHOD

BACKGROUND

1. Field

The present disclosure relates to an unmanned vehicle and an information processing method.

2. Description of Related Art

Information processing systems that cause an unmanned vehicle to deliver a package to a user have been in practical use. A typical system includes an unmanned vehicle (cart) that travels between points at which packages are to be received. The points are relatively near the entrance of buildings in which users (purchasers) reside.

A user uses, for example, a smartphone to unlock a box of the unmanned vehicle and then receives the package accommodated in the box.

The unmanned vehicle waits at a point until the user receives the package. Thus, for example, the box of the unmanned vehicle may be broken into so that the package is stolen. Further, the unmanned vehicle itself may be stolen.

The unmanned vehicle of the typical system includes an omnidirectional camera that captures a person approaching the unmanned vehicle. However, this camera has blind spots at certain angles. Thus, consideration has been given to how to increase the level of safety.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect provides an unmanned vehicle. The unmanned vehicle is configured to execute: a capturing device detection process that detects an external capturing device located at or around a delivery location where a package is to be received; a range identifying process that identifies a capture range of the external capturing device; a stop position determining process that determines, within the capture range of the external capturing device, a stop position of the unmanned vehicle at which the package is to be received; and a movement control process that stops the unmanned vehicle at the stop position.

Another aspect provides an unmanned vehicle. The unmanned vehicle configured to execute: a captured data acquiring process that acquires captured data from an external capturing device located at or around a delivery location where a package is to be received; and a movement control process that recognizes a position of the unmanned vehicle based on the captured data and stops the unmanned vehicle within a capture range of the external capturing device.

A further aspect provides an information processing method. The information processing method includes: executing, by one or more computers that control an unmanned vehicle that delivers a package, a capturing device detection process that detects an external capturing device located at or around a delivery location where the package is to be received; executing, by the one or more computers, a range identifying process that identifies a capture range of the external capturing device; executing, by the one or more computers, a stop position determining process that determines, within the capture range of the external capturing device, a stop position of the unmanned vehicle at which the package is to be received; and executing, by the one or more computers, a movement control process that stops the unmanned vehicle at the stop position.

Other features and aspects will be apparent from the following detailed description, the drawings, and the claims.

BRIEF DESCRIPTION OF THE DRAWINGS

FIG. 2 is a table showing delivery plan data of the first embodiment.

FIG. 3 is a table showing delivery record data of the first embodiment.

FIG. 4 is a table showing recognition history data of the first embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An unmanned vehicle, an information processing device, and an information processing system according to a first embodiment will now be described. The information processing system of this embodiment is a logistics management system that uses an unmanned ground vehicle (UGV) traveling on a road to deliver a package.

Logistics Management System

Figure 1:
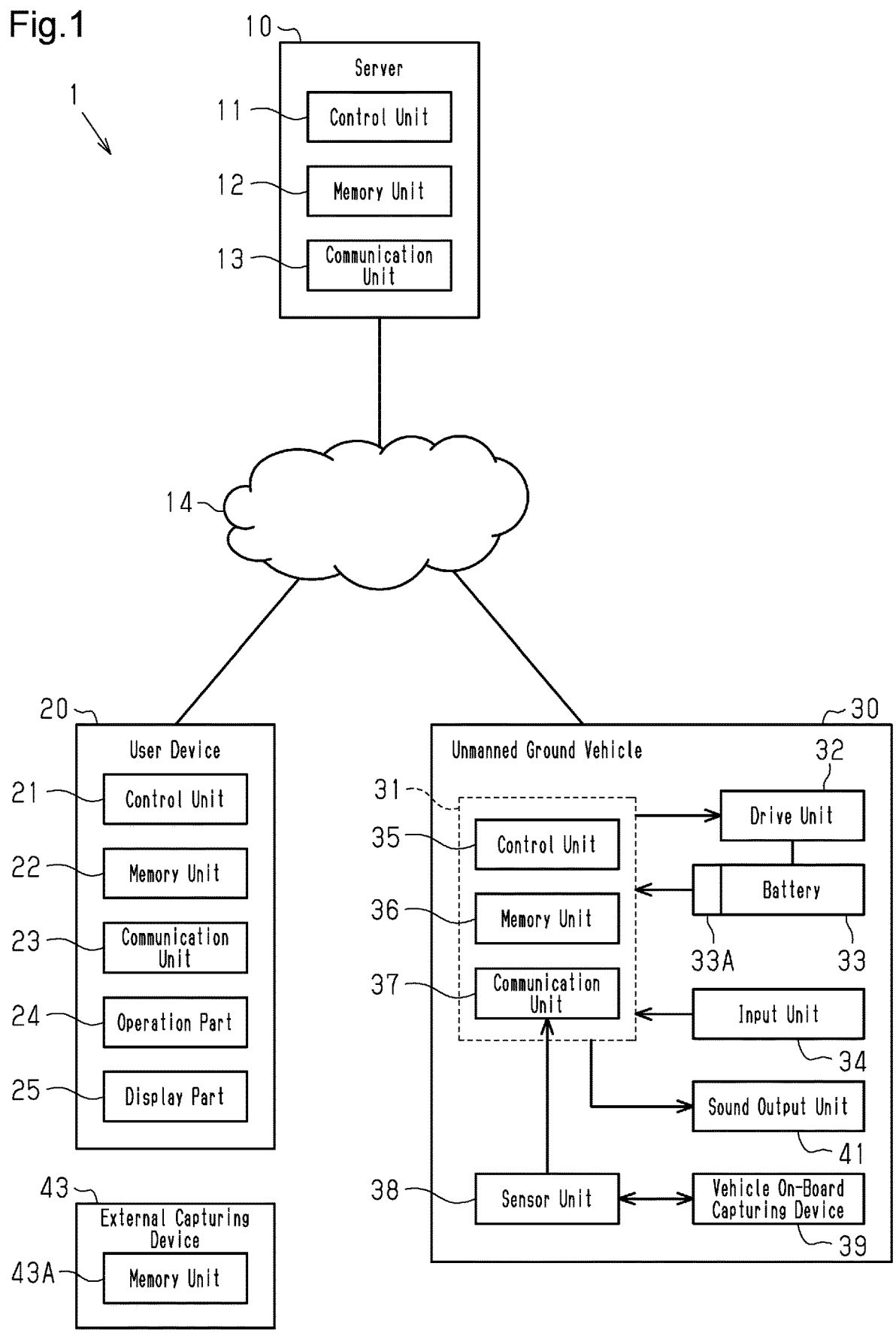
FIG. 1 is a diagram schematically showing the configuration of a logistics management system according to a first embodiment.

As shown in FIG. 1, a logistics management system 1 includes a server 10 and an unmanned ground vehicle 30. The logistics management system 1 is connected to a user device 20 via a network 14.

Server

The server 10 is managed by a logistics manager. The server 10 includes a control unit 11, a memory unit 12, and a communication unit 13. The control unit 11 includes an arithmetic logic unit and a memory (memory medium). The arithmetic logic unit loads, for example, an operating system and various programs (e.g., logistics management program) into the memory of the control unit 11 from the memory unit 12 or a storage, and executes instructions retrieved from the memory of the control unit 11. The arithmetic logic unit may have one of the following configurations.

(1) Circuitry including one or more processors that run according to a computer program (software);
(2) Circuitry including one or more dedicated hardware circuits that execute at least part of various processes; or
(3) Circuitry including a combination thereof.

The arithmetic logic unit includes a CPU and a memory (e.g., RAM and ROM). The memory stores program codes or commands configured to cause the CPU to execute processes. The memory, or computer-readable medium, includes any type of medium that is accessible by general-purpose computers or dedicated computers. Alternatively, instead of or in addition to the CPU, the arithmetic logic unit may include a dedicated hardware circuit (for example, application specific integrated circuit (ASIC)) that executes hardware processing for at least part of the processes executed by the arithmetic logic unit.

The memory unit 12 is an auxiliary storage device (memory medium), and includes various types of information used to manage logistics. The communication unit 13 is implemented as hardware, software, or a combination thereof. The communication unit 13 sends and receives data to and from the user device 20 and the unmanned ground vehicle 30 via the network 14. The server 10 may include an operation part or a display part for which a logistics manager or the like performs an input operation.

User Device

The user device 20 is an information processing device used by a user who uses the logistics management system 1. The user device 20 is a multi-functional telephone terminal (e.g., smartphone), a tablet terminal, a personal computer, a wearable computer, or another information processing device.

The user device 20 includes a control unit 21, a memory unit 22, a communication unit 23, an operation part 24, and a display part 25. The control unit 21 includes an arithmetic logic unit and a memory (memory medium). The arithmetic logic unit and memory have a similar configuration to the server 10 and thus have one of the above configurations (1) to (3). The arithmetic logic unit loads, for example, an operating system and various programs (e.g., a program that executes delivery-related processes) into the memory of the control unit 21 from the memory unit 22 or a storage, and executes instructions retrieved from the memory of the control unit 21.

The memory unit 22 has a similar configuration to the memory unit 12 of the server 10. The memory unit 22 may store a program that executes processes related to delivery. The program may be an application program used for receiving the offer of delivery services or may be a program that receives the offer of delivery services using a social networking service (SNS). Alternatively, the program may be an application program capable of receiving notification emails related to delivery. As another option, the memory unit 22 may store a web browser program that interprets a markup language, such as a hypertext markup language (HTML), and JavaScript®. The web browser program displays a delivery-related webpage that has been acquired from a web server included in the logistics management system 1. The communication unit 23 is implemented as hardware, software, or a combination thereof. The communication unit 23 sends and receives data to and from the server 10 via the network 14. The operation part 24 is a touch panel integrated with the display part 25 (e.g., display). Alternatively, the operation part 24 is, for example, an operation button, a keyboard, a mouse, or a controller on a case or the like of the user device 20. The display part 25 outputs various types of images according to an output instruction of the control unit 21.

Unmanned Ground Vehicle

The unmanned ground vehicle 30 is a mobile unit without a person onboard. The unmanned ground vehicle 30 is managed by a logistics manager or another owner. The unmanned ground vehicle 30 includes a control device 31, a drive unit 32, a battery 33 (energy source), an input unit 34, a sensor unit 38, a vehicle on-board capturing device 39, and a sound output unit 41.

The control device 31 controls the drive unit 32. The drive unit 32 includes, for example, a drive source that is driven by electric power supplied from the battery 33, a power transmission mechanism that is operated by the power obtained from the drive source, or a control circuit that controls the drive source or the like. In the present embodiment, the drive source is an electric motor. The drive source may be an engine that is driven by consuming fuel. In this case, instead of the battery 33, the unmanned ground vehicle 30 includes a fuel supplying unit that supplies the drive unit 32 with fuel as the energy source. The unmanned ground vehicle 30 may include a hybrid drive unit 32 equipped with various types of drive sources. The power transmission mechanism transmits the power of the drive source to wheels. Additionally, the unmanned ground vehicle 30 may be able to not only move in the rotation direction of the wheels but also turn at a fixed position or move parallel in a predetermined direction. For example, the wheels may be able to rotate not only in a first direction and its opposite direction but also in multiple directions, including a direction that is orthogonal to the first direction. The wheels of the unmanned ground vehicle 30 may be omni wheels or mecanum wheels.

The input unit 34 is an input device to which the authentication or the like of a user who receives a package is input. The input unit 34 is, for example, a touch panel to which the user enters an authentication code such as a personal identification number (PIN), an input device on which a button is arranged, or a scanner that recognizes a barcode or a two-dimensional code presented.

The sensor unit 38 includes a sensor used for autonomous traveling and a sensor that detects external environment information related to the surroundings of the unmanned ground vehicle 30. The sensor used for autonomous traveling includes a global positioning system (GPS) that detects the current location. The sensor may include at least one of an acceleration sensor, a gyro sensor, a geomagnetic sensor, an altitude sensor, or a displacement sensor.

The sensor that detects the external environment information may include an occupancy sensor (human detecting sensor) that detects a human. The occupancy sensor may be a known sensor. For example, the occupancy sensor may be at least one of an infrared sensor, an ultrasonic sensor, an image sensor (a visible light sensor), or the like. In one example, the occupancy sensor may be a combination of an infrared sensor in which a LiDAR sensor is employed and an image sensor. LiDAR stands for light detection and ranging or laser imaging, detection, and ranging. LiDAR can also estimate the distance (depth) to an obstacle such as a person. One or more sensors that detect the external environment information may also include, for example, a wind speed sensor, a temperature sensor, and a humidity sensor.

The vehicle on-board capturing device 39 is mounted on the unmanned ground vehicle 30. The vehicle on-board capturing device 39 preferably includes an omnidirectional camera that performs capturing in all directions (the entire sphere) in which the unmanned ground vehicle 30 is centered, or includes multiple visible light cameras.

The sound output unit 41 is implemented as a combination of hardware and software, and outputs a sound (e.g., operation guidance). The sound output unit 41 uses sound information stored in the control device 31 to perform sound processing. For example, the voice of the operation guidance explains to the user how to take a package out of a box mounted on the unmanned ground vehicle 30 and enable the unmanned ground vehicle 30 to start traveling to the next destination.

The control device 31 will now be described. The control device 31 includes a control unit 35, a memory unit 36, and a communication unit 37. The control unit 35 has a similar configuration to the control unit 11 of the server 10 or the control unit 21 of the user device 20. The control device 31 is used as a capturing device detection unit, a range identifying unit, a stop position determining unit, and a movement control unit.

The control unit 35 obtains the remaining capacity of the battery 33 from a remaining capacity detection circuit 33A in the battery 33. The remaining capacity detection circuit 33A of the battery 33 detects the remaining capacity of the battery 33 and outputs it to the control unit 35. The control unit 35 obtains remaining capacity information from the remaining capacity detection circuit 33A and sends it to the server 10 via the communication unit 37. The server 10 manages the state of charge of the unmanned ground vehicle 30.

The memory unit 36 has a similar configuration to the memory unit 12 of the server 10 or the memory unit 22 of the user device 20. The memory unit 36 stores an autonomous traveling program and various types of information (e.g., map information) that is necessary for autonomous traveling. The memory unit 36 further stores a program used to execute various types of image processing. Image processing is executed to recognize a predetermined object using a captured image. In the present embodiment, the predetermined object is an external capturing device 43. For a process that identifies the external capturing device 43, a known image recognition process may be used. Examples of the known image recognition process may include at least one of edge computing, feature extraction, pattern matching, or pattern recognition.

The communication unit 37 is implemented as hardware, software, or a combination thereof. The communication unit 37 sends and receives data to and from the user device 20 and the server 10 via the network 14.

The communication unit 37 sends various notifications to the user device 20 via the network 14. The unmanned ground vehicle 30 may send a notification to the unmanned ground vehicle 30 via the server 10. Alternatively, the unmanned ground vehicle 30 may send a notification to the unmanned ground vehicle 30 without using the server 10. The unmanned ground vehicle 30 may be connected to a manager terminal (not shown) used by a delivery manager via the network 14. Using the manager terminal, the delivery manager may visually check an image captured by the image sensor of the unmanned ground vehicle 30 to monitor the state of the unmanned ground vehicle 30.

Data Configuration

The data stored in the memory unit 12 of the server 10 will now be described with reference to FIGS. 2 to 4. The server 10 stores delivery plan data 50, delivery record data 51, and recognition history data 52 in the memory unit 12. The server 10 includes a data management system that manages the information contained in the data 50, 51, 52. The structure of the database is not particularly limited. For example, the database structure may be a relational model, a hierarchical model, or a network model. FIGS. 2 to 4 each show an example of the data structure. The unmanned ground vehicle 30 stores, in the memory unit 36, the information necessary to deliver a package and send a notification from the delivery plan data 50 and the delivery record data 51.

FIG. 2 shows the delivery plan data 50. The delivery plan data 50 includes a delivery number, a user ID, a delivery address, a delivery date, a box number, a notification destination, and a delivery status. The delivery number is the identification information allocated to a package that is to be delivered. The user ID and delivery address each indicate a user who receives a package or the address of the user. The delivery address may be position information related to a delivery location where a package is to be received. When the delivery address is included in a multi-dwelling unit, the delivery location where a package is to be received may be set to the entrance of the multi-dwelling unit or a common area other than the entrance. When the delivery address is a standalone house, the delivery location where a package is to be received may be set to a location in front of the standalone house or a common area for multiple standalone houses. The delivery date indicates the date and time period in which a package is to be delivered. The box number indicates the identification information related to one of multiple accommodation portions of the unmanned ground vehicle 30 that accommodates a package that is to be delivered. The notification destination is a destination selected when a notification is sent to the user. For example, the unmanned ground vehicle 30 or the server 10 sends a notification to the user device 20 at at least one of the following points in time: when the server 10 accepts a delivery request; when the unmanned ground vehicle 30 leaves a station (e.g., warehouse); during a period in which the unmanned ground vehicle 30 departs from the station and then reaches the delivery location; or when the unmanned ground vehicle 30 reaches the delivery location. The notification destination includes at least one of the email address of the user, the telephone number of the user, or a device token of the user device 20. The notification destination may also include a sending destination to a communication device (e.g., an intercom). The delivery status indicates a delivery status of a package. For example, the delivery status is one of statuses including "delivery completed," "in transit," "not yet delivered," and the like. The delivery plan data 50 may include a delivery sequence and a delivery route.

FIG. 3 shows the delivery record data 51. The delivery record data 51 records the stop positions of the unmanned ground vehicle 30 in the past. At the stop position, the unmanned ground vehicle 30 stops (parks) so that the package can be received. The control device 31 sets the stop position to a position at which the unmanned ground vehicle 30 stops so that the package can be received, not to a position at which the unmanned ground vehicle 30 temporarily stops during traveling. For example, when a package receipt mode is selected, the stop position may be set to the position at which the package is to be received. The delivery record data 51 may not only include the delivery record of one unmanned ground vehicle 30 but also include the delivery record of another unmanned ground vehicle 30 that is of the same type as the one unmanned ground vehicle 30 and the delivery record of another unmanned ground vehicle 30 of a different type.

The delivery record data 51 includes vehicle identification information, a vehicle type, a stop position, a vehicle body orientation, and a delivery date. The vehicle identification information is allocated to each unmanned ground vehicle 30. The vehicle type refers to the type of the unmanned ground vehicle 30. The vehicle type included in the delivery record data 51 may be omitted if the delivery record data 51 is collected from unmanned ground vehicles 30 each having a similar structure and shape.

The stop position is information indicating a position at which the unmanned ground vehicle 30 stopped in the past. The stop position may be information indicating latitude and longitude, or may be information that is associated with facility information and indicates a predetermined position in the facility. The stop position corresponds to an actual stop position.

Instead, the information related to the stop position may be captured data obtained by capturing the surroundings of the unmanned ground vehicle 30 from the stop position. The vehicle body orientation is information indicating the orientation of the body of the unmanned ground vehicle 30. The vehicle body orientation may be information indicating the orientation of the body using the cardinal points. Alternatively, the vehicle body orientation may be information that is associated with facility information and indicates an orientation relative to the facility. The delivery date is the date at which a package was delivered.

FIG. 4 shows the recognition history data 52. The recognition history data 52 is generated when the unmanned ground vehicle 30 recognizes the external capturing device 43 based on the captured data. The recognition history data 52 includes a camera recognizing position, a delivery number, and a delivery date. The camera recognizing position indicates the position of the unmanned ground vehicle 30 that recognized the external capturing device 43. The camera recognizing position may include the position of the unmanned ground vehicle 30 that recognized the external capturing device 43 and the positional relationship between the external capturing device 43 relative to the unmanned ground vehicle 30 that recognized the external capturing device 43. The delivery number corresponds to the delivery number of the delivery plan data 50, and corresponds to a package that was received at a location where the external capturing device 43 was recognized. The delivery date indicates the date at which the external capturing device 43 was recognized.

Processes Executed by Control Device

The processes executed by the control device 31 will now be described. The control unit 35 executes a program stored in the memory unit 36 to execute a capturing device detection process, a range identifying process, a stop position determining process, a movement control process, an accommodation portion identifying process, and a record acquisition process.

The capturing device detection process detects the external capturing device 43 that is located at or around a delivery location where a package is to be received. The external capturing device 43 records captured data in a memory unit 43A.

The range identifying process identifies a capture range in which the external capturing device 43 can capture the unmanned ground vehicle 30. The range identifying process identifies the capture range based on the position and orientation of the external capturing device 43 or identifies, as the capture range, a predetermined range in which the external capturing device 43 is centered. In the present embodiment, the capture range is identified using the former method.

The stop position determining process determines, within the capture range of the external capturing device 43, the stop position of the unmanned ground vehicle 30 where the package is to be received.

The movement control process stops an unmanned vehicle body at the stop position. The unmanned vehicle body refers to the entire body of the unmanned ground vehicle 30. Further, the movement control process stops the unmanned ground vehicle 30 in a state in which its surface provided with an accommodation portion faces the external capturing device 43. The accommodation portion accommodates the package that is to be received at the delivery location.

The accommodation portion identifying process identifies the accommodation portion corresponding to the package that is to be received at the delivery location, based on the delivery plan data 50 associated with the delivery location and the box number, which is the identification information related to the accommodation portion.

The record acquisition process acquires the delivery record data 51 that records past stop positions of the unmanned ground vehicle 30. Then, the record acquisition process sets one of the past stop positions as an initial position that is used to determine the current stop position of the unmanned ground vehicle 30.

When the unmanned ground vehicle 30 is in a stopped state, the control device 31 determines whether the capturing of the unmanned vehicle body has been interrupted by the external capturing device 43. When determining that the capturing of the unmanned vehicle body has been interrupted, the control device 31 moves the unmanned ground vehicle 30 to a position at which the capturing of the unmanned vehicle body will not be interrupted.

Stop Procedure

A procedure for the unmanned ground vehicle 30 to stop at the stop position will now be described with reference to FIGS. 5 to 7.

Figure 5:
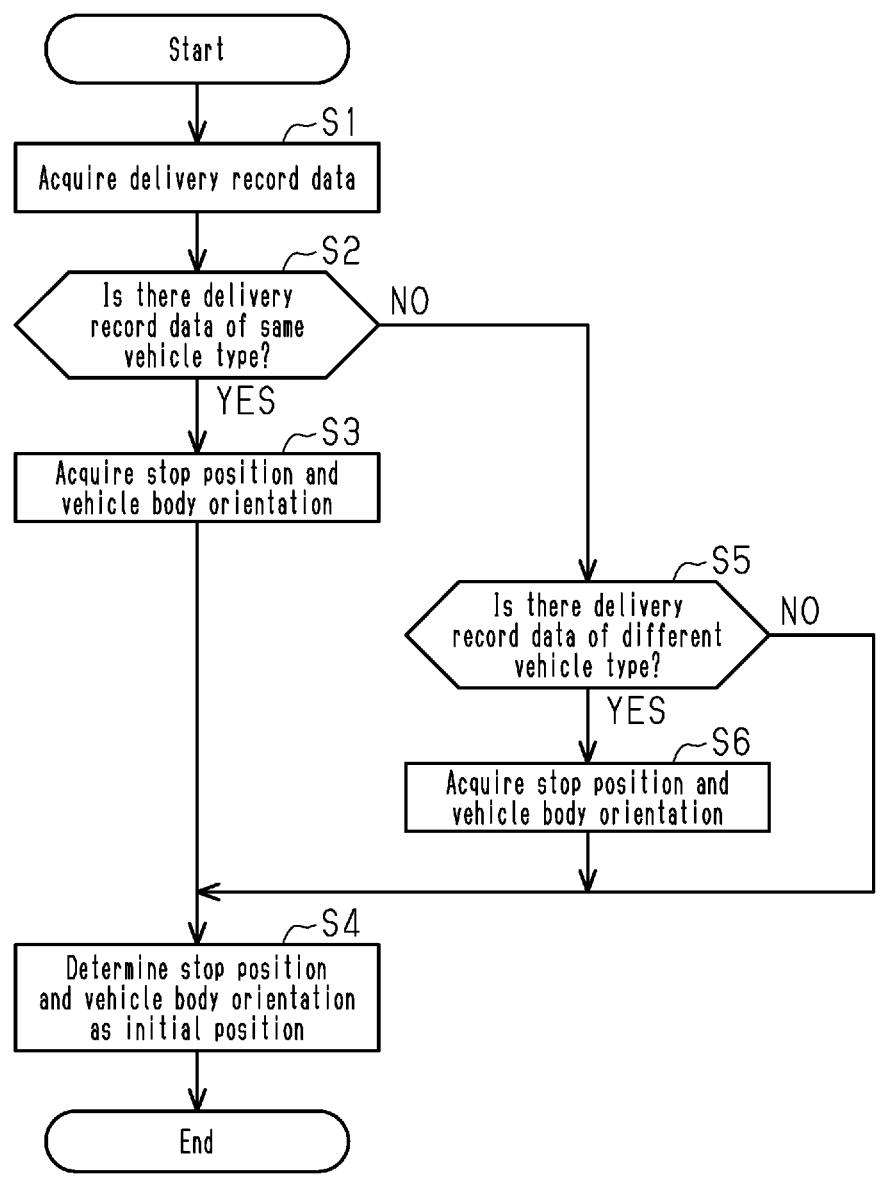
FIG. 5 is a flowchart showing a procedure of determining the initial position of the first embodiment.

FIG. 5 shows a procedure for determining the initial position. The control device 31 for the unmanned ground vehicle 30 acquires the delivery record data 51 indicating the record of delivering a package to the delivery location where the unmanned ground vehicle 30 has reached (step S1). Then, the control device 31 determines whether the acquired delivery record data 51 includes the delivery record data 51 related to the same vehicle type as that of the unmanned ground vehicle 30 (step S2).

When determining that the delivery record data 51 related to the same vehicle type as that of the unmanned ground vehicle 30 is included (step S2: YES), the control device 31 acquires the stop position and the vehicle body orientation from the delivery record data 51 related to the same vehicle type (step S3). Then, the control device 31 determines the acquired stop position and vehicle body orientation as the initial position (step S4). That is, the delivery record data 51 is data obtained when the image recognition on the external capturing device 43 was successful. In the case of using the delivery record data 51 related to the same vehicle type, when the unmanned ground vehicle 30 stops at the stop position and in the vehicle body orientation similar to those included in the past delivery record, the positional relationship of the vehicle on-board capturing device 39 relative to the external capturing device 43 is relatively close to the positional relationship included in the delivery record. This allows the external capturing device 43 to be readily searched for and allows the final stop position and vehicle body orientation to be efficiently determined.

In a case in which the stop position and vehicle body orientation included in the delivery record data 51 are shown in image data, the control device 31 may move the unmanned ground vehicle 30 such that the captured data obtained by the vehicle on-board capturing device 39 substantially matches the image data shown in the delivery record.

When determining that there is no delivery record data 51 related to the same vehicle type as that of the above unmanned ground vehicle 30 (step S2: NO), the control device 31 determines whether the delivery record data 51 of a different vehicle type exists (step S5). When determining that the delivery record data 51 of a different vehicle type exists (step S5: YES), the control device 31 acquires the stop position and vehicle body orientation included in the delivery record data 51 (step S6). Then, the control device 31 determines the acquired stop position and vehicle body orientation as the initial position (step S4). That is, even when there is no delivery record of the unmanned ground vehicle 30 of the same vehicle type, the delivery record of the unmanned ground vehicle 30 of a different vehicle type may exist. In such a case, if the stop position and vehicle body orientation included in that record are set as the initial position and then finely adjusted, the final stop position and vehicle body orientation can be efficiently determined.

Figure 6:
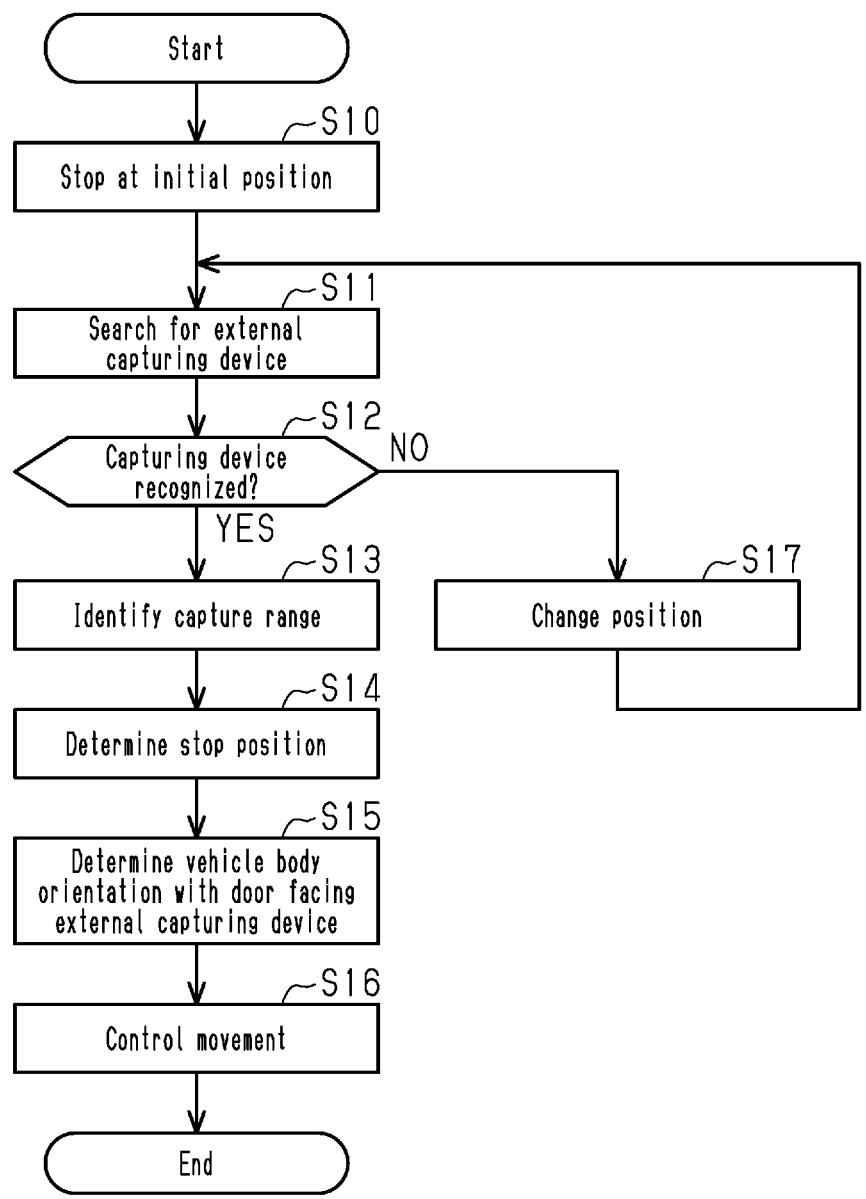
FIG. 6 is a flowchart showing a procedure of determining the stop position of the first embodiment.

FIG. 6 shows a procedure of determining the stop position and the vehicle body orientation. The control device 31 stops the vehicle body at the initial position (step S10). In a case in which the initial position has been determined based on the delivery record data 51, the position of the unmanned ground vehicle 30 is adjusted in correspondence with the stop position and the vehicle body orientation that are set as the initial position. In a case in which the initial position has not been determined based on the delivery record data 51, the unmanned ground vehicle 30 is stopped at a predetermined position (e.g., the entrance of the delivery location) or a position determined in advance by the delivery manager.

Next, the control device 31 searches for the external capturing device 43 located around the initial position (step S11). Specifically, the control device 31 acquires captured data from the vehicle on-board capturing device 39. Then, the control device 31 uses the captured data to recognize the external capturing device 43. For example, the control device 31 performs preprocessing (e.g., edge detection) on the captured data as necessary and extracts a feature. Further, the control device 31 determines whether the extracted feature is classified as the external capturing device 43. For example, the lens or lens cover of the external capturing device 43 may be extracted as the feature. When extracting the feature classified as the external capturing device 43, the control device 31 determines that the external capturing device 43 is present. The control device 31 may also identify the type of the external capturing device 43. Examples of the type of the external capturing device 43 include a capturing device having a viewing angle of less than 360° or an omnidirectional capturing device having a viewing angle of 360°.

Subsequently, the control device 31 uses the identification result to determine whether the external capturing device 43 has been recognized (step S12). When determining that the external capturing device 43 has not been recognized (step S12: NO), the control device 31 changes the position of the unmanned ground vehicle 30 (step S17). When the position of the unmanned ground vehicle 30 is changed, at least one of the stop position or the vehicle body orientation is changed. When changing the position of the unmanned ground vehicle 30, the control device 31 returns to step S11 and repeats searching for the external capturing device 43. When the control device 31 cannot recognize the external capturing device 43 within a predetermined time, the control device 31 sets the stop position as the initial position or the like. The unmanned ground vehicle 30 stops at the stop position to wait until the user receives a package.

When determining that the external capturing device 43 has been recognized (step S12: YES), the control device 31 identifies the capture range (step S13). In the present embodiment, the control device 31 recognizes the lens or housing of the external capturing device 43 and estimates the orientation of the external capturing device 43 from the direction of the lens or housing. The control device 31 sets the capture range to a sectoral or triangular range in which the external capturing device 43 is centered and which spreads in the orientation of the external capturing device 43. The identified capture range does not have to completely match an actual capture range of the external capturing device 43 and only needs to generally match the actual capture range in its orientation and size. When recognizing the type of the external capturing device 43, the control device 31 may identify the capture range according to that type. For example, when recognizing that the external capturing device 43 is an omnidirectional camera, the control device 31 may set the capture range to a circular predetermined range in which the external capturing device 43 is centered.

Then, the control device 31 uses the identified capture range to determine the stop position (step S14). In this step, the control device 31 determines the stop position within the identified capture range.

Further, the control device 31 determines the vehicle body orientation such that the door of an accommodation portion 45 faces the external capturing device 43 (step S15). Specifically, the control device 31 refers to the box number included in the delivery plan data 50 to identify the accommodation portion 45 that accommodates the package to be delivered. Then, the control device 31 determines the vehicle body orientation such that the door of the accommodation portion 45 or the side surface provided with the door faces the external capturing device 43.

Then, the control device 31 performs movement control to stop the unmanned ground vehicle 30 at the stop position (step S16). In this step, the control device 31 stops the body of the unmanned ground vehicle 30 and causes the body of the unmanned ground vehicle 30 to turn in the identified vehicle body orientation. When the movement control is completed, the unmanned ground vehicle 30 waits until the user receives the package.

Figure 7:
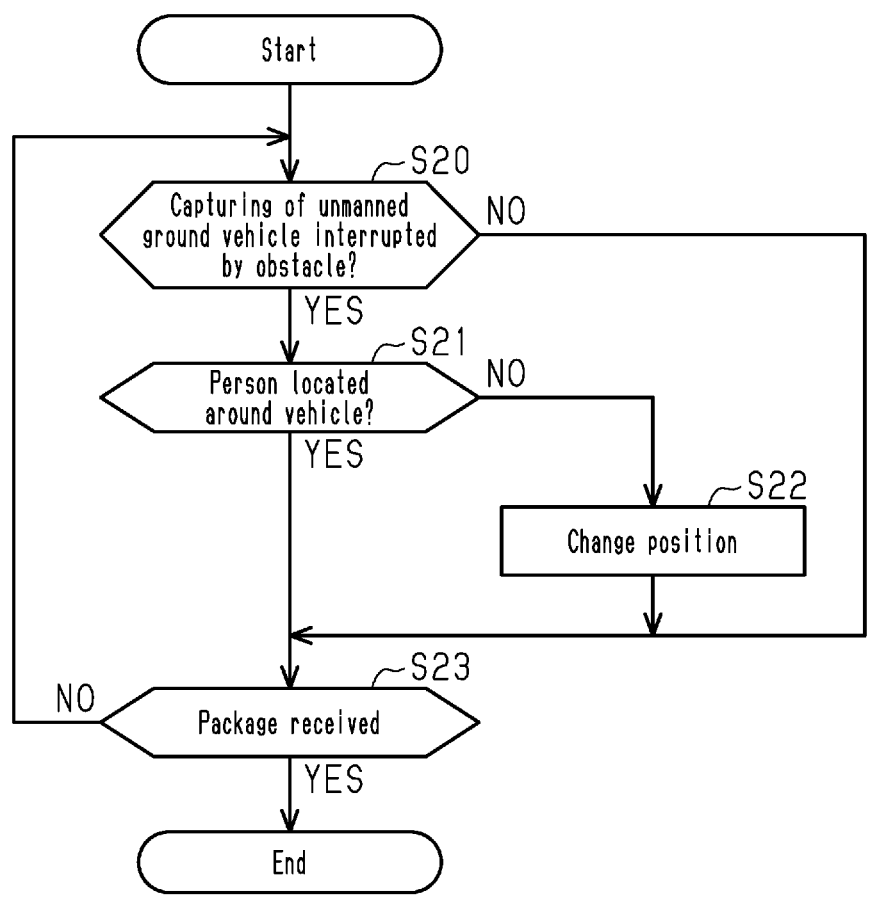
FIG. 7 is a flowchart showing a procedure of changing the stop position of the first embodiment.

FIG. 7 shows a procedure of detecting an obstacle. The control device 31 acquires captured data from the external capturing device 43 to determine whether the capturing of the unmanned vehicle body by the external capturing device 43 has been interrupted by an obstacle (step S20). Specifically, when the entire external capturing device 43 can be recognized based on the captured data, the control device 31 determines that there is no obstacle. When at least part of the external capturing device 43 cannot be recognized based on the captured data, the control device 31 determines that there is an obstacle. Alternatively, the control device 31 may use an ultrasonic sensor, an infrared sensor, or the like to determine whether there is an obstacle within a predetermined range in which the unmanned ground vehicle 30 is centered.

When determining that there is no obstacle (step S20: NO), the control device 31 maintains the current stop position and vehicle body orientation. Then, the control device 31 determines whether the package has been received (step S23). Specifically, when the accommodation portion 45 is unlocked and then locked or when an operation that completes the receipt is performed on the input unit 34, the control device 31 determines that the package has been received. When determining that the package has not been received (step S23: NO), the control device 31 returns to step S20 and repeats the detecting for an obstacle.

When determining that the capturing of the unmanned vehicle body by the external capturing device 43 has been interrupted by an obstacle (step S20: YES), the control device 31 determines whether a person is located in the surroundings of the unmanned vehicle body (step S21). Specifically, the control device 31 uses the vehicle on-board capturing device 39 or the sensor unit 38 to determine whether a person is located in the surroundings of the unmanned vehicle body.

When determining that no person is located in the surroundings of the unmanned vehicle body (step S21: NO), the control device 31 changes the position of the unmanned ground vehicle 30 (step S22). When the position is changed, at least one of the stop position or the vehicle body orientation is changed. At the changed position, the control device 31 keeps the door of the accommodation portion 45 facing the external capturing device 43. When determining that a person is located in the surroundings of the unmanned vehicle body (step S21: YES), the control device 31 maintains the current stop position and vehicle body orientation without changing the position of the unmanned vehicle body. When determining that the package has been received (step S23: YES), the control device 31 terminates the detecting for an obstacle.

Steps will now be described with reference to FIGS. 8 to 11. The unmanned ground vehicle 30 includes a substantially rectangular vehicle body (unmanned vehicle body) that has outer surfaces. The vehicle body has, for example, two side surfaces (a right surface and a left surface in a case in which the vehicle body is oriented in the direction of traveling), a front surface, a rear surface, a top surface, and a bottom surface. The unmanned ground vehicle 30 includes one or more accommodation portions 45. Each accommodation portion 45 opens in at least one of the surfaces of the vehicle body. The unmanned ground vehicle 30 includes a door that covers the opening of each accommodation portion 45. The door selectively opens and closes the opening.

Figure 8:
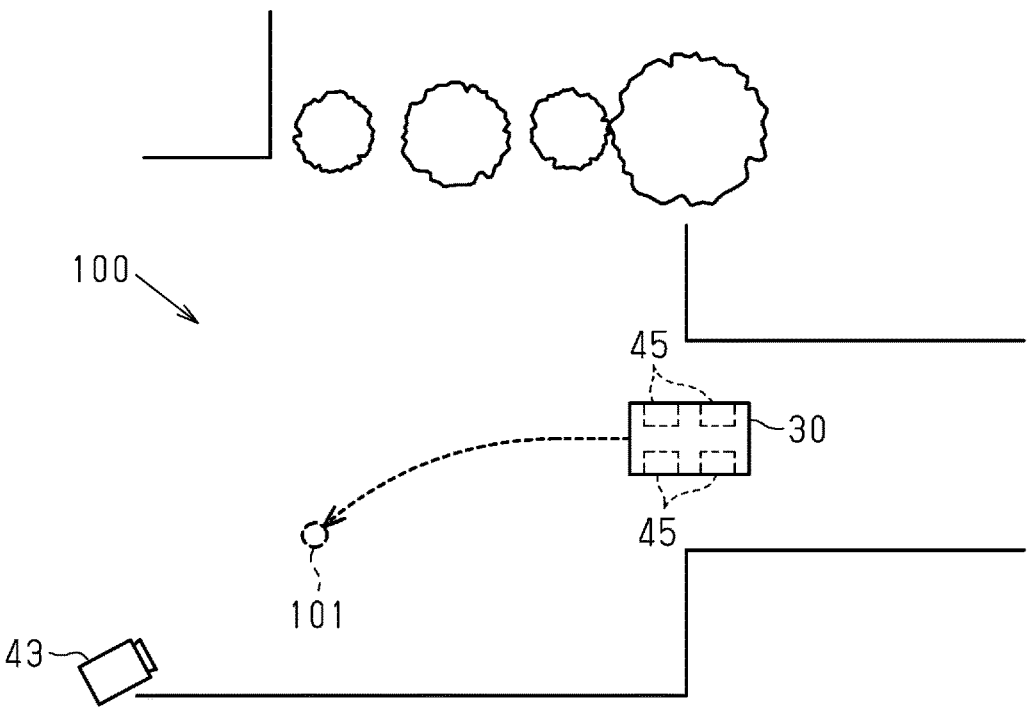
FIG. 8 is a diagram schematically illustrating the step of the unmanned vehicle of the first embodiment moving to the initial position.

FIG. 8 illustrates the step of moving the unmanned ground vehicle 30 toward the initial position. The unmanned ground vehicle 30 may include the door of the accommodation portion 45 only on one side surface. Alternatively, two or more side surfaces may each be provided with one or more accommodation portions 45.

In the unmanned ground vehicle 30 of FIG. 8, the doors of two accommodation portions 45 are arranged on each of the two side surfaces of the vehicle body. When reaching a delivery location 100 that corresponds to the delivery address, the unmanned ground vehicle 30 moves to the determined initial position 101. The external capturing device 43 is located at the delivery location 100. The external capturing device 43 is, for example, a surveillance camera installed in a multi-dwelling unit.

Figure 9:
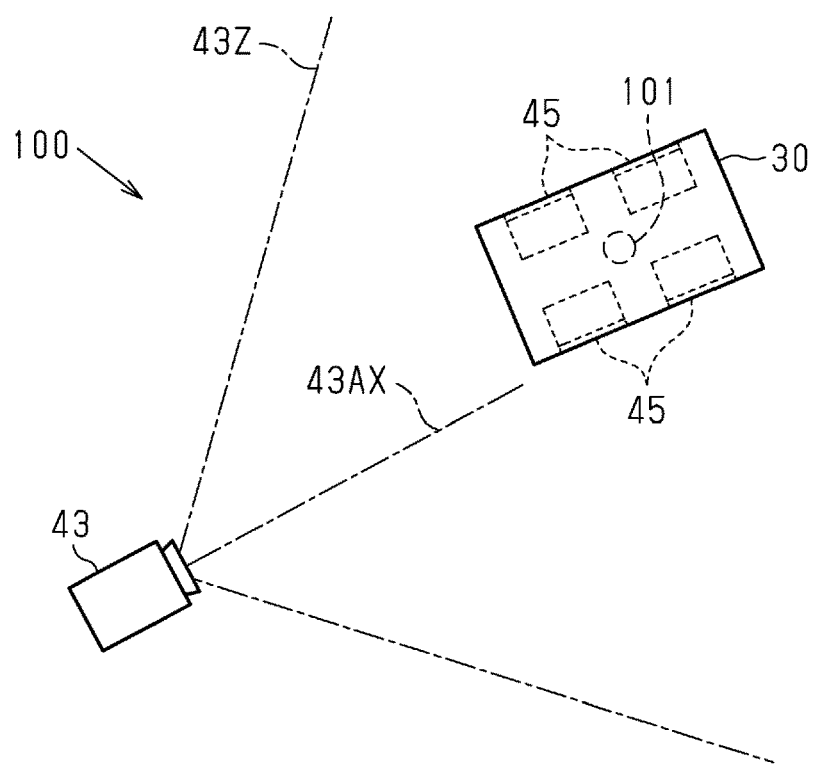
FIG. 9 is a diagram schematically illustrating the step of recognizing the external capturing device of the first embodiment.

FIG. 9 illustrates the step of detecting the external capturing device 43 and the step of identifying the capture range. After stopping at the initial position 101, the unmanned ground vehicle 30 uses the vehicle on-board capturing device 39 to capture the surroundings of the unmanned ground vehicle 30. The control device 31 acquires the captured data from the vehicle on-board capturing device 39 to recognize the external capturing device 43.

Further, the control device 31 identifies an orientation (optical axis) 43AX of the external capturing device 43 from the recognition result of the external capturing device 43 using the captured data. The control device 31 sets, as a capture range 43Z, a sectoral or triangular predetermined range in which the external capturing device 43 is centered. The control device 31 may capture the external capturing device 43 at a different angle by slightly moving the unmanned ground vehicle 30.

Figure 10:
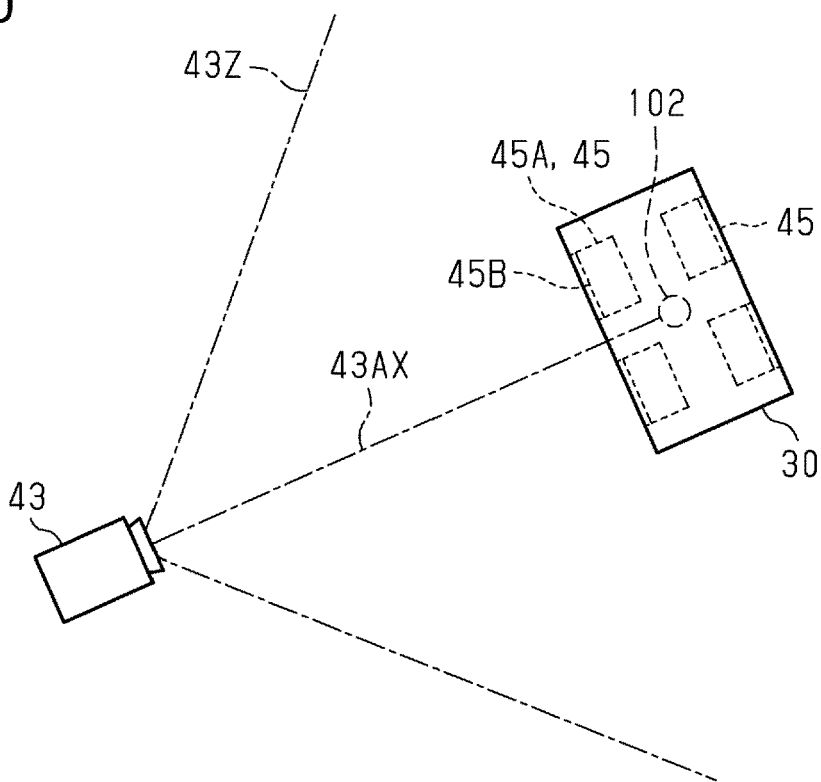
FIG. 10 is a diagram schematically illustrating the step of stopping the unmanned vehicle at the stop position in the first embodiment.

FIG. 10 shows the step of finalizing the stop position and the vehicle body orientation and moving the unmanned ground vehicle 30 to the stop position. The control device 31 sets, as a stop position 102, a position in the capture range 43Z. For example, the stop position 102 may be separated from the external capturing device 43 by a predetermined distance. Further, the stop position 102 may be located on the orientation 43AX of the external capturing device 43. The control device 31 uses the delivery plan data 50 to identify an accommodation portion 45A that accommodates the package to be delivered. Then, the control device 31 determines that the vehicle body orientation is a direction in which a door 45B of the accommodation portion 45A faces the external capturing device 43. For example, as shown in FIG. 10, the side surface of the unmanned ground vehicle 30 provided with the door 45B of the accommodation portion 45A faces the external capturing device 43. Further, the vehicle body orientation is set such that the orientation 43AX of the external capturing device 43 intersects the side surface of the unmanned ground vehicle 30 provided with the door 45B of the accommodation portion 45A. The control device 31 controls the drive unit 32 to move the unmanned ground vehicle 30 to the stop position 102 and stops the unmanned ground vehicle 30 in the determined vehicle body orientation.

Figure 11:
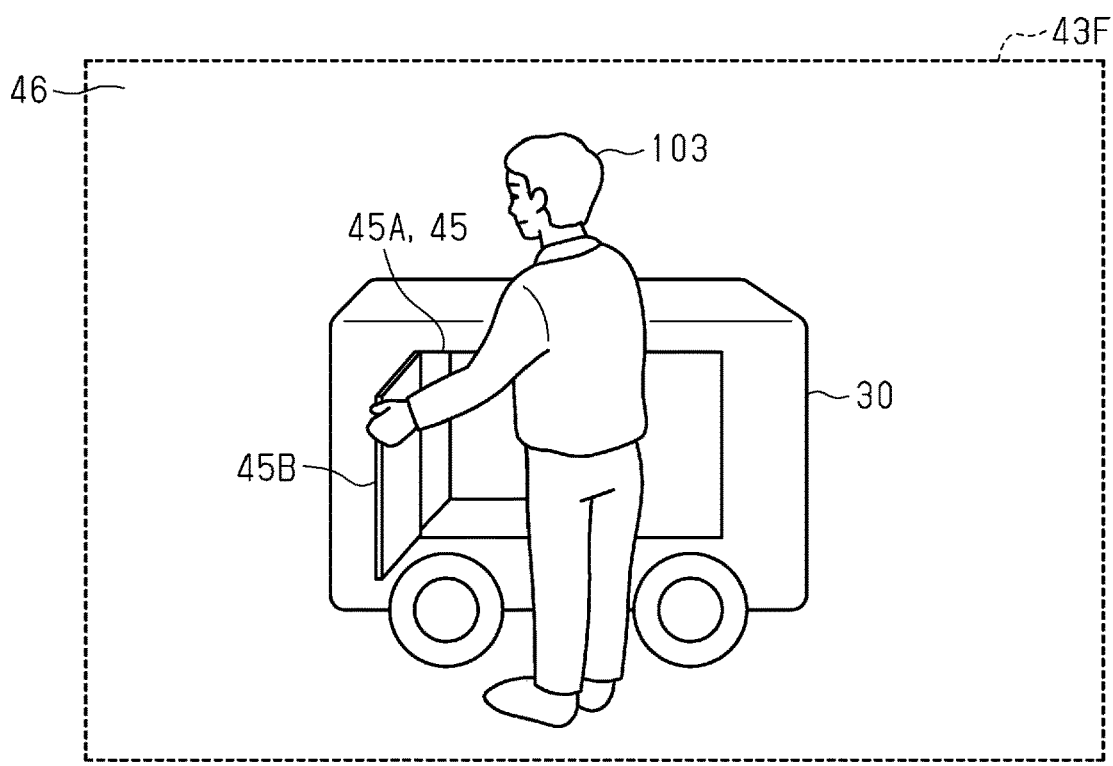
FIG. 11 is a diagram schematically illustrating an image captured by the external capturing device of the first embodiment.

FIG. 11 shows an image 46 captured by the external capturing device 43. A user 103 who receives the package performs user authentication on the unmanned ground vehicle 30. Further, the user 103 unlocks and opens the door 45B. Since the door 45B of the accommodation portion 45A faces the external capturing device 43, the external capturing device 43 can capture, for example, the hand of the user 103 and the accommodation portion 45A with the door 45B open. Thus, when, for example, an unexpected situation (e.g., package theft) occurs or a person other than the user who should receive the package erroneously receives the package, such a scene can be recorded as image data in the memory unit 43A of the external capturing device 43. The server 10 may acquire captured data captured by the external capturing device 43 via the network 14 and record it as a history in the memory unit 12.

After the package is received, the control device 31 generates the delivery record data 51 and sends it to the server 10. Upon receipt of the delivery record data 51, the server 10 stores the delivery record data 51 in the memory unit 12.

After recognizing the external capturing device 43, the control device 31 generates the recognition history data 52. The control device 31 includes the coordinates of the position where the external capturing device 43 was captured, the date when the external capturing device 43 was recognized, and the delivery number corresponding to the package that was delivered. The control device 31 sends the generated recognition history data 52 to the server 10. The server 10 records the recognition history data 52 in the memory unit 12. By recording the recognition history data 52 in this manner, when there is a need to confirm a scene in which the package was received, the server 10 can efficiently search for the external capturing device 43 that captured the scene.

The advantages of the first embodiment will now be described.

(1-1) The unmanned ground vehicle 30 stops within the capture range of the external capturing device 43. Thus, a scene in which a user is receiving a package can be captured from outside of the unmanned ground vehicle 30. Accordingly, the captured data recorded by the external capturing device 43 can be effectively used for safety management and the like. Further, the unmanned ground vehicle 30 detects the external capturing device 43. Thus, even if authentication is not performed between the external capturing device 43 and the unmanned ground vehicle 30, the external capturing device 43 located around the delivery location can be effectively used.

(1-2) The unmanned ground vehicle 30 has a surface provided with the accommodation portion 45 that accommodates the package to be received at the delivery location. The unmanned ground vehicle 30 stops in a state in which the surface faces the external capturing device 43. Thus, a scene in which the user is receiving the package can be captured, including, for example, the hand of the user or the opening of the accommodation portion 45.

(1-3) When determining the vehicle body orientation, the unmanned ground vehicle 30 identifies the accommodation portion 45A that accommodates the package to be received at the delivery location. Then, the door 45B of the identified accommodation portion 45A faces the external capturing device 43. Thus, even if the door 45B of the accommodation portion 45 is arranged on each of the opposite sides of the unmanned ground vehicle 30, the unmanned ground vehicle 30 can be captured including, for example, the hand of the user or the opening of the accommodation portion 45.

(1-4) The unmanned ground vehicle 30 identifies the capture range 43Z based on the position and the orientation 43AX of the external capturing device 43. Thus, the unmanned ground vehicle 30 can be stopped in a state in which its surface that should be captured faces the external capturing device 43.

(1-5) The unmanned ground vehicle 30 uses the past delivery record data 51 to determine the initial position 101 and then detects the external capturing device 43 at the initial position. Accordingly, the external capturing device 43 is detected efficiently.

(1-6) In the first embodiment, the external capturing device 43 fixed at or around the delivery location. Thus, for example, a surveillance camera installed in a house or a store or a surveillance camera installed on the street or the like of a residential area can be used as the external capturing device 43.

(1-7) When the unmanned ground vehicle 30 is waiting for the user to receive the package, an obstacle may enter to interrupt the capturing of the unmanned ground vehicle 30. The first embodiment allows the unmanned ground vehicle 30 to move to a position where the capturing by the external capturing device 43 is not interrupted.

Second Embodiment

Figure 12:
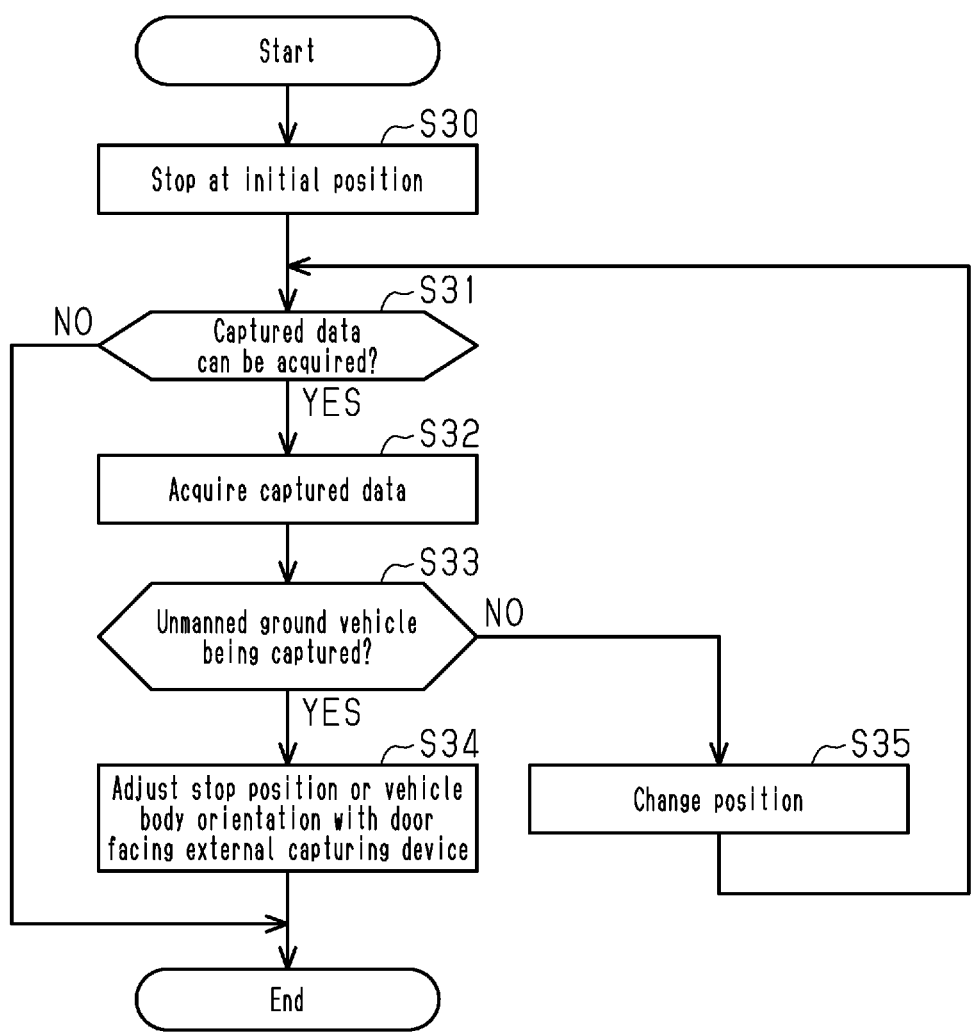
FIG. 12 is a flowchart showing a procedure of determining the stop position according to a second embodiment.

The logistics system according to a second embodiment will now be described with reference to FIGS. 12 to 14. In the first embodiment, the unmanned ground vehicle 30 identifies the external capturing device 43. The second embodiment is different from the first embodiment in that the unmanned ground vehicle 30 acquires captured data from the external capturing device 43. The control device 31 of the second embodiment corresponds to a captured data acquiring unit and a movement control unit. Further, the control device 31 executes a captured data acquiring process and a movement control process.

In the second embodiment, the unmanned ground vehicle 30 can search for the external capturing device 43. The unmanned ground vehicle 30 is connected to the external capturing device 43 such that the unmanned ground vehicle 30 can receive captured data from the external capturing device 43. For example, the control device 31 stores, in the memory unit 36, a program that uses an application programming interface (API) that can send and receive data to and from the external capturing device 43. By executing the program, the control unit 35 automatically searches for the external capturing device 43, performs authentication with the external capturing device 43, and acquires the captured data. For example, the unmanned ground vehicle 30 searches for a terminal that is located around the unmanned ground vehicle 30 and that can issue a notification. The communication unit 37 searches for the terminal through near-field communication. For near-field communication, a communication mode conforming to Bluetooth® can be used. Alternatively, the unmanned ground vehicle 30 may use map data in which the position of the external capturing device 43 is registered in advance. The unmanned ground vehicle 30 may search for the position of the external capturing device 43 by searching the map data.

When detecting the external capturing device 43, the unmanned ground vehicle 30 acquires the captured data from the external capturing device 43 through wireless communication. In this case, a communication standard that allows the captured data to be sent is used. For example, Wi-Fi® peer-to-peer connection may be used. The acquired captured data is data obtained immediately after the external capturing device 43 performs capturing. The unmanned ground vehicle 30 can acquire the captured data captured in real time.

A procedure of the captured data acquiring process and the movement control process will now be described with reference to FIG. 12. In the same manner as step S10, the control device 31 stops the unmanned ground vehicle 30 at the initial position 101 (step S30). Then, the control device 31 determines whether captured data can be acquired from the external capturing device 43 (step S31).

When the external capturing device 43 is detected and authentication performed by the external capturing device 43 is successful, the control device 31 determines that the captured data can be acquired from the external capturing device 43 (step S31: YES). Next, the control device 31 acquires the captured data from the external capturing device 43 (step S32).

Then, the control device 31 uses the acquired captured data to determine whether the unmanned ground vehicle 30 acting as a host vehicle is being captured (step S33). Specifically, the control device 31 extracts a feature from the captured data. When the extraction result contains the feature of the unmanned ground vehicle 30, the control device 31 determines that the unmanned ground vehicle 30 has been captured. When the extraction result does not contain the feature of the unmanned ground vehicle 30, the control device 31 determines that the unmanned ground vehicle 30 has not been captured.

When the entire unmanned ground vehicle 30 is included in a frame 43F of the external capturing device 43, the control device 31 may determine that the unmanned ground vehicle 30 has been captured. Alternatively, when a specific section of the unmanned ground vehicle 30 is included in the frame 43F of the external capturing device 43, the control device 31 may determine that the unmanned ground vehicle 30 has been captured. The specific section refers to the entire accommodation portion 45 or refers to the door 45B of the accommodation portion 45 that accommodates the package to be received.

When determining that the unmanned ground vehicle 30 is not being captured by the external capturing device 43 (step S33: NO), the control device 31 changes the position of the unmanned ground vehicle 30 (step S35). When the position is changed, at least one of the stop position or the vehicle body orientation is changed. When the position is changed, the control device 31 returns to step S31 and determines whether the captured data can be acquired.

When determining that the unmanned ground vehicle 30 is being captured by the external capturing device 43 (step S33: YES), the control device 31 adjusts the vehicle body orientation such that the door 45B of the accommodation portion 45 faces the external capturing device 43 (step S34). In the same manner as step S15, the control device 31 refers to the box number included in the delivery plan data 50 to identify the accommodation portion 45A that accommodates the package to be delivered. Then, the control device 31 moves the unmanned ground vehicle 30 such that the door 45B of the identified accommodation portion 45A faces the external capturing device 43.

In step S31, when the control device 31 fails to detect the external capturing device 43 and determines that the captured data cannot be acquired (step S31: NO), the control device 31 terminates the process. Only when a predetermined time has elapsed since it was determined that the captured data could not be acquired at the initial position 101, or up to a predetermined number of times since that determination, the control device 31 may retry to acquire the captured data.

Figure 13:
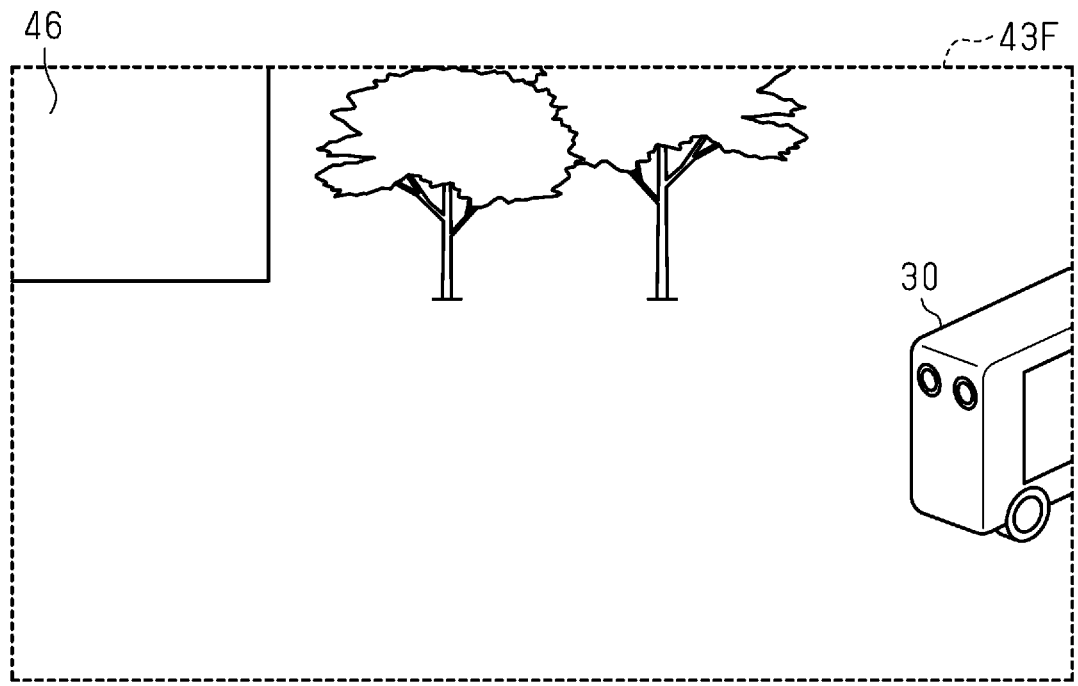
FIG. 13 is a diagram illustrating the captured data acquired by the unmanned vehicle of the second embodiment.
Figure 14:
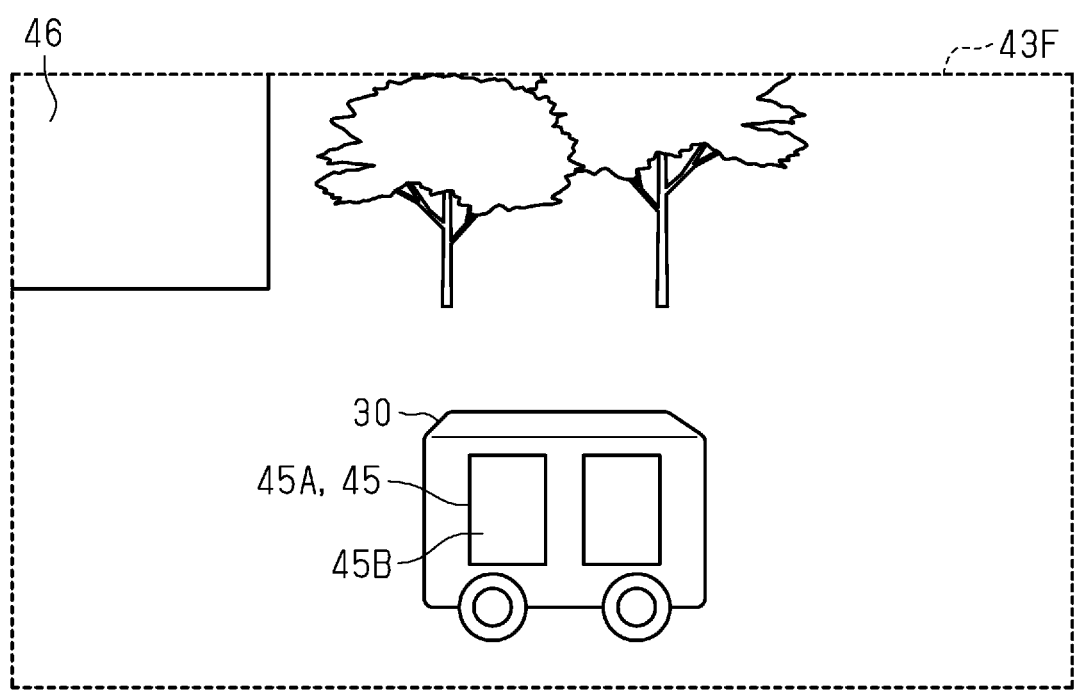
FIG. 14 is a diagram of the captured data acquired by the unmanned vehicle of the second embodiment, illustrating a state in which the stop position has been adjusted.

FIGS. 13 and 14 each illustrate the image 46 captured by the external capturing device 43. In the image 46 of FIG. 13, only part of the unmanned ground vehicle 30 is captured. While identifying the unmanned ground vehicle 30 based on the captured data, the control device 31 for the unmanned ground vehicle 30 moves the unmanned ground vehicle 30 such that the entire unmanned ground vehicle 30 is located within the frame 43F of the external capturing device 43. Further, the control device 31 adjusts the vehicle body orientation such that the door 45B of the accommodation portion 45A, accommodating the package to be delivered, faces the external capturing device 43. As described above, the unmanned ground vehicle 30 may be stopped at a position such that at least a specific section of the unmanned ground vehicle 30 is included in the frame 43F of the external capturing device 43 and part of the unmanned ground vehicle 30 is located outside of the frame 43F.

FIG. 14 illustrates a state in which the unmanned ground vehicle 30 stops at the stop position. The entire vehicle body of the unmanned ground vehicle 30 is included in the frame 43F of the external capturing device 43. Further, the door 45B of the accommodation portion 45A accommodating the package to be delivered faces the external capturing device 43. This allows the external capturing device 43 to capture a scene in which a user is receiving a package, including, for example, the hand of the user or the opening of the accommodation portion 45A.

The second embodiment provides the following advantages in addition to advantages (1-2), (1-3), (1-6), and (1-7) of the first embodiment.

(2-1) The unmanned ground vehicle 30 stops within the capture range 43Z of the external capturing device 43. Thus, a scene in which a user is receiving a package can be captured from outside of the unmanned ground vehicle 30. Accordingly, the captured data recorded by the external capturing device 43 can be effectively used for safety management and the like. Additionally, the unmanned ground vehicle 30 acquires the captured data from the external capturing device 43. Thus, even if the capture range 43Z of the external capturing device 43 is not identified, the unmanned ground vehicle 30 can be stopped at a correct position in the capture range 43Z.

(2-2) The unmanned ground vehicle 30 uses the past delivery record data 51 to determine the initial position 101. Then, the captured data is acquired from the external capturing device 43. Accordingly, the captured data is acquired efficiently.

The above embodiments may be modified as follows. The above embodiments and the following modifications can be combined as long as the combined modifications remain technically consistent with each other.

In the above embodiments, the control device 31 determines the initial position using the delivery record data 51. Instead of the delivery record data 51, the control device 31 may determine the initial position using a position recorded in the map data.

In the above embodiments, the control device 31 generates the recognition history data 52. This process may be omitted. For example, when the delivery record data 51 can be used instead of the recognition history data 52, the control device 31 may use the delivery record data 51 to search for the external capturing device 43 which captured the unmanned ground vehicle 30.

In the first embodiment, every time the unmanned ground vehicle 30 delivers a package to the delivery location 100, the external capturing device 43 is detected to determine the stop position and the vehicle body orientation. In the second embodiment, every time the unmanned ground vehicle 30 delivers a package to the delivery location 100, captured data is acquired from the external capturing device 43 and the position of the unmanned ground vehicle 30 is adjusted such that the unmanned ground vehicle 30 is included in the frame 43F of the external capturing device 43. Instead, when a package is delivered to the delivery location 100 associated with the delivery record data 51, the stop position and the vehicle body orientation included in the delivery record data 51 may be used. In this case, the process that detects the external capturing device 43, the process that acquires the captured data and the like may be omitted.

Captured Data Acquiring Process

In the second embodiment, the control device 31 acquires captured data from the external capturing device 43 located at or around the delivery location where a package is to be received. When acquiring the captured data, the control device 31 may control the external capturing device 43. In this modification, the external capturing device 43 includes a mechanism that automatically changes the orientation of the external capturing device 43. For example, when the unmanned ground vehicle 30 is not included in the frame 43F of the external capturing device 43, the control device 31 may send an orientation changing request to the external capturing device 43 to change the orientation 43AX of the external capturing device 43. Upon receipt of the orientation changing request, the external capturing device 43 changes the orientation of the external capturing device 43 based on an orientation included in the orientation changing request. The request sent from the control device 31 to the external capturing device 43 may be to change the angle of view, enlarge or reduce an image, or the like.

In the second embodiment, the control device 31 directly acquires captured data from the external capturing device 43. Instead, for example, the control device 31 may acquire captured data from the external capturing device 43 via the server 10.

Movement Control Process

In the first embodiment, the movement control process identifies the capture range based on the detected orientation and position of the external capturing device 43. In addition, after identifying the capture range based on the detected orientation and position of the external capturing device 43, the control device 31 may acquire captured data from the external capturing device 43 to finalize the stop position and orientation of the unmanned ground vehicle 30.

In the above embodiments, the unmanned ground vehicle 30 is stopped in a state in which its side surface provided with the door 45B of the accommodation portion 45A faces the external capturing device 43. Instead, the unmanned ground vehicle 30 may be stopped in a state in which the side surface provided with the door 45B does not face the external capturing device 43. For example, the orientation of the unmanned ground vehicle 30 may be determined preferentially based on another condition. For example, when a package is received on the street in front of a standalone house, the unmanned ground vehicle 30 may be stopped at a position and in a direction such that a specific section of the unmanned ground vehicle 30 is included in the capture range 43Z of the external capturing device 43 and the traveling of a pedestrian, an automobile, and the like is not interrupted. In this configuration, at least a scene in which a package is being received can be captured.

External Capturing Device

In the above configurations, the external capturing device 43 may be located at or around the delivery location 100. The external capturing device 43 may be replaced with a capturing device mounted on a mobile unit that is located at or around the delivery location 100. For example, a dashboard camera mounted on an automobile may be used. Alternatively, a capturing device mounted on a drone that flies at or around the delivery location 100 may be used. As another option, a capturing device mounted on another unmanned ground vehicle located at or around the delivery location 100 may be used.

Unmanned Vehicle

The unmanned ground vehicle 30 performs autonomous traveling in which the host vehicle travels autonomously. Instead, the unmanned ground vehicle 30 may follow another unmanned ground vehicle 30 or the like that travels ahead.

The unmanned ground vehicle 30 may be remotely operated by a manager terminal. The manager terminal is connected to the network 14.

The unmanned vehicle may be an unmanned aerial vehicle. The unmanned aerial vehicle is an aerial vehicle without a person onboard. In the same manner as the unmanned ground vehicle 30, the unmanned aerial vehicle includes a control device, a drive unit, a battery, and a user authentication unit. The drive unit includes a drive source that is driven by electric power supplied from the battery, a rotary wing that is operated by power obtained from the drive source, and the like. In addition to a program for autonomous flying, the memory of the controller stores various types of information (e.g., map information and carrying plan information). The unmanned aerial vehicle only needs to stop within the capture range 43Z of the external capturing device 43. The unmanned aerial vehicle has a smaller size than the unmanned ground vehicle 30. Thus, the unmanned aerial vehicle does not have to be directed in a specific orientation.

Configuration of Logistics Management System

In the above embodiments, the unmanned ground vehicle 30 delivers a package. Instead, or in addition, the unmanned ground vehicle 30 may pick up a package.

In the above embodiments, the unmanned ground vehicle 30 executes the capturing device detection process, the range identifying process, the stop position determining process, the movement control process, the captured data acquiring process, the accommodation portion identifying process, and the like. Instead, the server 10 or the manager terminal may execute at least one of these processes. For example, in a case in which the server 10 executes some of the processes and the unmanned ground vehicle 30 executes the remaining processes, the server 10 and the unmanned ground vehicle 30 send and receive the results of the processes to and from each other if the results need to be shared. Alternatively, the external capturing device 43 may serve as the logistics management system 1 to execute the processes including the stop position determining process, the movement control process, and the accommodation portion identifying process.

The technical ideas understood from the above-described embodiment and the modifications are as follows.

[Aspect 1] An unmanned vehicle, wherein the unmanned vehicle is configured to execute:

a capturing device detection process that detects an external capturing device located at or around a delivery location where a package is to be received;

a range identifying process that identifies a capture range of the external capturing device;

a stop position determining process that determines, within the capture range of the external capturing device, a stop position of the unmanned vehicle at which the package is to be received; and a movement control process that stops the unmanned vehicle at the stop position.

[Aspect 2] An unmanned vehicle, wherein the unmanned vehicle is configured to execute:
   a captured data acquiring process that acquires captured data from an external capturing device located at or around a delivery location where a package is to be received;
   and a movement control process that recognizes a position of the unmanned vehicle based on the captured data and stops the unmanned vehicle within a capture range of the external capturing device.

[Aspect 3] The unmanned vehicle according to aspect 1 or 2, wherein the movement control process stops the unmanned vehicle in a state in which a surface of the unmanned vehicle provided with an accommodation portion faces the external capturing device, the accommodation portion being configured to accommodate the package that is to be received at the delivery location.

[Aspect 4] The unmanned vehicle according to aspect 3, comprising:
   side surfaces;
   one or more accommodation portions opening in at least one of the side surfaces, the accommodation portions each being configured to accommodate the package; and
   a door that covers an opening of the accommodation portion, the door selectively opening and closing the opening, wherein
   the unmanned vehicle is further configured to execute an accommodation portion identifying process that identifies the accommodation portion corresponding to the package that is to be received at the delivery location, based on delivery plan data associated with the delivery location and identification information related to each of the accommodation portions, and
   the movement control process uses the delivery plan data to stop the unmanned vehicle such that the side surface provided with the door that covers the opening of the identified accommodation portion is oriented in a direction that is included in the capture range of the external capturing device, the door selectively opening and closing the opening.

[Aspect 5] The unmanned vehicle according to aspect 1, wherein the range identifying process identifies the capture range based on a position and an orientation of the external capturing device.

[Aspect 6] The unmanned vehicle according to aspect 1 or 5, wherein the range identifying process identifies, as the capture range, a predetermined range in which the external capturing device is centered.

[Aspect 7] The unmanned vehicle according to any one of aspects 1, 5, and 6, wherein the movement control process acquires captured data from the external capturing device and adjusts, using the captured data, the stop position such that the unmanned vehicle is included in the capture range of the external capturing device.

[Aspect 8] The unmanned vehicle according to any one of aspects 1 to 7, wherein the unmanned vehicle is configured to:
   acquire record data that records an actual stop position, the actual stop position being a past stop position at which the package was received; and
   determine a new stop position of the unmanned vehicle by setting the actual stop position as an initial position.

[Aspect 9] The unmanned vehicle according to any one of aspects 1 to 8, wherein the external capturing device is a capturing device located at or around the delivery location.

[Aspect 10] The unmanned vehicle according to any one of aspects 1 to 9, wherein the external capturing device is a capturing device mounted on a mobile unit that is located at or around the delivery location.

[Aspect 11] The unmanned vehicle according to according to any one of aspects 1 to 10, wherein the unmanned vehicle in a stopped state is configured to determine whether capturing of the unmanned vehicle performed by the external capturing device has been interrupted by an obstacle and, when determining that the capturing of the unmanned vehicle has been interrupted, move the unmanned vehicle to a position that allows the external capturing device to capture the unmanned vehicle.

[Aspect 12] A computer-readable medium recording a control program that causes one or more computers that control an unmanned vehicle that delivers a package to execute:
   a capturing device detection process that detects an external capturing device located at or around a delivery location where the package is to be received;
   a range identifying process that identifies a capture range of the external capturing device;
   a stop position determining process that determines, within the capture range of the external capturing device, a stop position of the unmanned vehicle at which the package is to be received; and
   a movement control process that stops the unmanned vehicle at the stop position.

[Aspect 13] A computer-readable medium recording a control program that causes one or more computers that control an unmanned vehicle that delivers a package to execute:
   a captured data acquiring process that acquires captured data from an external capturing device located at or around a delivery location where a package is to be received; and
   a movement control process that recognizes a position of the unmanned vehicle based on the captured data and stops the unmanned vehicle within a capture range of the external capturing device.

[Aspect 14] An information processing method comprising:
   executing, by one or more computers that control an unmanned vehicle that delivers a package, a capturing device detection process that detects an external capturing device located at or around a delivery location where the package is to be received;
   executing, by the one or more computers, a range identifying process that identifies a capture range of the external capturing device;
   executing, by the one or more computers, a stop position determining process that determines, within the capture range of the external capturing device, a stop position of the unmanned vehicle at which the package is to be received; and
   executing, by the one or more computers, a movement control process that stops the unmanned vehicle at the stop position.

[Aspect 15] An information processing method comprising:
   executing, by one or more computers that control an unmanned vehicle that delivers a package, a captured data acquiring process that acquires captured data from an external capturing device located at or around a delivery location where a package is to be received; and executing, by the one or more computers, a movement control process that recognizes a position of the unmanned vehicle based on the captured data and stops the unmanned vehicle within a capture range of the external capturing device.

[Aspect 16] An information processing system comprising:
a capturing device detection unit that detects an external capturing device located at or around a delivery location where a package is to be received;
a range identifying unit that identifies a capture range of the external capturing device;
a stop position determining unit that determines, within the capture range of the external capturing device, a stop position of the unmanned vehicle at which the package is to be received; and
a movement control unit that stops the unmanned vehicle at the stop position.

[Aspect 17] An information processing system comprising:
a captured data acquiring unit that acquires captured data from an external capturing device located at or around a delivery location where a package is to be received; and
a movement control unit that recognizes a position of the unmanned vehicle based on the captured data and stops the unmanned vehicle within a capture range of the external capturing device.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:
1. An unmanned vehicle comprising:
a vehicle on-board capturing device;
one or more processors; and
one or more memories, the one or more memories storing a computer program, the computer program comprising:
acquisition code configured to cause the one or more processors to acquire captured data of surroundings of the unmanned vehicle captured by the vehicle on-board capturing device;
detection code configured to cause the one or more processors to detect an external capturing device located at or around a delivery location where a package is to be received based on the captured data;
range code configured to cause the one or more processors to identify a capture range of the external capturing device;
determination code configured to cause the one or more processors to determine, within the capture range of the external capturing device, a stop position of the unmanned vehicle at which the package is to be received; and
movement code configured to cause the one or more processors to stop the unmanned vehicle at the stop position,
wherein the movement code is further configured to cause the one or more processors to stop the unmanned vehicle in a state in which a surface of the unmanned vehicle provided with an accommodation portion faces the external capturing device, the accommodation portion being configured to accommodate the package that is to be received at the delivery location, and
wherein the unmanned vehicle further comprises:
side surfaces;
one or more accommodation portions opening in at least one of the side surfaces, the accommodation portions each being configured to accommodate the package; and
a door that covers an opening of the accommodation portion, the door selectively opening and closing the opening, wherein
the computer program further comprises accommodation code configured to cause the one or more processors to identify the accommodation portion corresponding to the package that is to be received at the delivery location, based on delivery plan data associated with the delivery location and identification information related to each of the accommodation portions, and
the movement code is further configured to cause the one or more processors to use the delivery plan data to stop the unmanned vehicle such that a side surface provided with the door that covers the opening of the identified accommodation portion is oriented in a direction that is included in the capture range of the external capturing device, the door selectively opening and closing the opening.

2. The unmanned vehicle according to claim 1, wherein the range code is further configured to cause the one or more processors to identify the capture range based on a position and an orientation of the external capturing device.

3. The unmanned vehicle according to claim 1, wherein the range code is further configured to cause the one or more processors to identify, as the capture range, a predetermined range in which the external capturing device is centered.

4. The unmanned vehicle according to claim 1, wherein the movement code is further configured to cause the one or more processors to acquire captured data from the external capturing device and adjusts, using the captured data, the stop position such that the unmanned vehicle is included in the capture range of the external capturing device.

5. The unmanned vehicle according to claim 1, wherein the computer program further comprises:
record code configured to cause the one or more processors to record an actual stop position, the actual stop position being a past stop position at which the package was received; and
the movement code is further configured to cause the one or more processors to determine a new stop position of the unmanned vehicle by setting the actual stop position as an initial position.

6. The unmanned vehicle according to claim 1, wherein the external capturing device is a capturing device located at or around the delivery location.

7. The unmanned vehicle according to claim 1, wherein the external capturing device is a capturing device mounted on a mobile unit that is located at or around the delivery location.

8. The unmanned vehicle according to claim 1, wherein the computer program further comprises obstacle code configured to cause the one or more processors, when the unmanned vehicle is in a stopped state, to determine whether capturing of the unmanned vehicle performed by the external capturing device has been interrupted by an obstacle and, when determining that the capturing of the unmanned vehicle has been interrupted, move the unmanned vehicle to a position that allows the external capturing device to capture the unmanned vehicle.

9. An unmanned vehicle comprising:
    side surfaces;
    one or more accommodation portions opening in at least one of the side surfaces, the accommodation portions each being configured to accommodate a package;
    a door that covers an opening of the accommodation portion, the door selectively opening and closing the opening;
    one or more processors; and
    one or more memories, the one or more memories storing a computer program, the computer program comprising:
    data acquisition code configured to cause the one or more processors to capture data from an external capturing device located at or around a delivery location where a package is to be received;
    movement code configured to cause the one or more processors to recognize a position of the unmanned vehicle based on the captured data and stop the unmanned vehicle within a capture range of the external capturing device,
    wherein the movement code is further configured to cause the one or more processors to stop the unmanned vehicle in a state in which a surface of the unmanned vehicle provided with an accommodation portion faces the external capturing device, the accommodation portion being configured to accommodate the package that is to be received at the delivery location; and
    accommodation code configured to cause the one or more processors to identify the accommodation portion corresponding to the package that is to be received at the delivery location, based on delivery plan data associated with the delivery location and identification information related to each of the accommodation portions,
    wherein the movement code is further configured to cause the one or more processors to use the delivery plan data to stop the unmanned vehicle such that a side surface provided with the door that covers the opening of the identified accommodation portion is oriented in a direction that is included in the capture range of the external capturing device, the door selectively opening and closing the opening.

10. The unmanned vehicle according to claim 9, wherein the computer program further comprises:
    record code configured to cause the one or more processors to record an actual stop position, the actual stop position being a past stop position at which the package was received; and
    the movement code is further configured to cause the one or more processors to determine a new stop position of the unmanned vehicle by setting the actual stop position as an initial position.

11. The unmanned vehicle according to claim 9, wherein the external capturing device is a capturing device located at or around the delivery location.

12. The unmanned vehicle according to claim 9, wherein the external capturing device is a capturing device mounted on a mobile unit that is located at or around the delivery location.

13. The unmanned vehicle according to claim 9, wherein the computer program further comprises obstacle code configured to cause the one or more processors, when the unmanned vehicle is in a stopped state, to determine whether capturing of the unmanned vehicle performed by the external capturing device has been interrupted by an obstacle and, when determining that the capturing of the unmanned vehicle has been interrupted, move the unmanned vehicle to a second position that allows the external capturing device to capture the unmanned vehicle.

14. An information processing method comprising:
    executing, by one or more computers that control an unmanned vehicle that delivers a package, an acquisition process that acquires captured data of surroundings of the unmanned vehicle captured by a vehicle on-board capturing device;
    executing, by the one or more computers, a capturing device detection process that detects an external capturing device located at or around a delivery location where the package is to be received based on the captured data;
    executing, by the one or more computers, a range identifying process that identifies a capture range of the external capturing device;
    executing, by the one or more computers, a stop position determining process that determines, within the capture range of the external capturing device, a stop position of the unmanned vehicle at which the package is to be received;
    executing, by the one or more computers, a movement control process that stops the unmanned vehicle at the stop position;
    stopping the unmanned vehicle in a state in which a surface of the unmanned vehicle provided with an accommodation portion faces the external capturing device, the accommodation portion being configured to accommodate the package that is to be received at the delivery location,
    wherein the unmanned vehicle comprises: side surfaces; one or more accommodation portions opening in at least one of the side surfaces, the accommodation portions each being configured to accommodate the package; and a door that covers an opening of the accommodation portion, the door selectively opening and closing the opening,
    the information processing method further comprising:
    identifying the accommodation portion corresponding to the package that is to be received at the delivery location, based on delivery plan data associated with the delivery location and identification information related to each of the accommodation portions, and
    by using the delivery plan data, stopping the unmanned vehicle such that a side surface provided with the door that covers the opening of the identified accommodation portion is oriented in a direction that is included in the capture range of the external capturing device, the door selectively opening and closing the opening.

* * * * *